US006302818B1

(12) United States Patent
Haight

(10) Patent No.: US 6,302,818 B1
(45) Date of Patent: Oct. 16, 2001

(54) TAPERED BUSHING FOR A ROLLER CHAIN

(75) Inventor: Jeffrey A. Haight, Avon, IN (US)

(73) Assignee: Amsted Industries Incorporated, Chicago, IL (US)

( * ) Notice: Subject to any disclaimer, the term of this patent is extended or adjusted under 35 U.S.C. 154(b) by 0 days.

(21) Appl. No.: 09/358,219

(22) Filed: Jul. 21, 1999

(51) Int. Cl.[7] .................................................... F16G 13/02

(52) U.S. Cl. ............................................ 474/231; 474/230

(58) Field of Search ............................... 474/84–89, 209, 474/210, 206, 214, 215, 228, 229, 230–234, 213, 212

(56) References Cited

U.S. PATENT DOCUMENTS

| | | | |
|---|---|---|---|
| Re. 22,488 | 5/1944 | Focke | 74/255 |
| 1,877,339 | 8/1932 | Kottlowski . | |
| 1,925,055 | 8/1933 | Mize | 74/32 |
| 1,945,357 * | 1/1934 | Pierce | 474/231 X |
| 2,049,841 * | 8/1936 | Kjaer | 474/231 X |
| 2,113,980 * | 4/1938 | Brill | 474/231 X |
| 2,155,584 * | 4/1939 | Bryant et al. | 474/231 |
| 2,293,029 | 8/1942 | Focke | 74/255 |
| 2,424,087 | 7/1947 | Focke et al. | 74/251 |
| 2,431,702 * | 12/1947 | McCann | 474/231 |
| 3,054,300 * | 9/1962 | Bowman | 474/230 X |
| 5,885,318 | 3/1999 | Shimizu et al. | 65/493 |

FOREIGN PATENT DOCUMENTS

947669 * 1/1964 (GB) .

* cited by examiner

*Primary Examiner*—David A. Bucci
*Assistant Examiner*—Marcus Charles
(74) *Attorney, Agent, or Firm*—Edward J. Brosius

(57) ABSTRACT

A roller-chain bushing with a stress-relief opening centrally located along the seam of a rolled or roll-formed bushing has a tapered or relief segment at each bushing end to permit compressive fitting of the bushing ends into a link-plate hole thereby minimizing deformation of the bushing end, which tapered or relief segment is locally deformed or worked at a specific location prior to forming the bushing and the tapered segment is provided in a bushing region diametrically opposite the seam to reduce barreling of the bushing at mating of the bushing with the roller link-plate, and positioning of the tapered region along the chain pitch line at the point of stress concentration during chain assembly reduces the initial wear of the pin and bushing from initial chain loading.

6 Claims, 2 Drawing Sheets

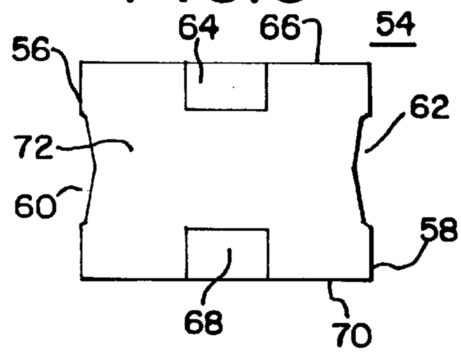
FIG.6
64
66
54
56
62
72
60
58
68
70
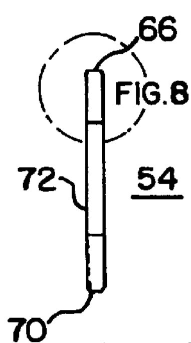
FIG.7
66
FIG.8
72
54
70
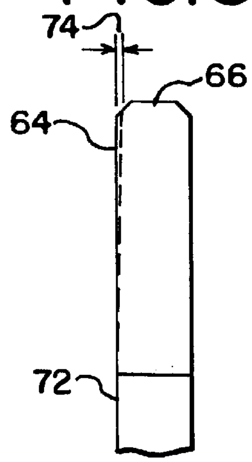
FIG.8
74
66
64
72
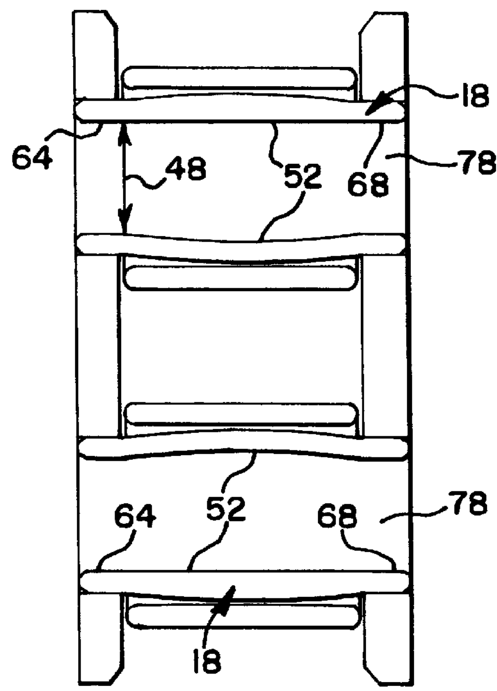
FIG.10
18
64
48
52
68
78
64
52
68
78
18
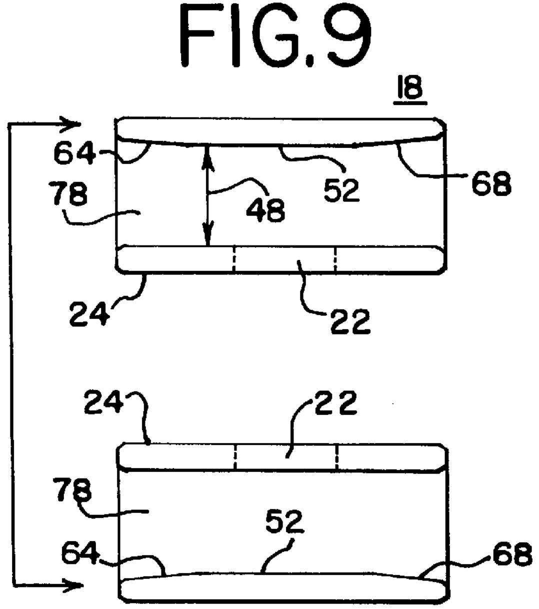
FIG.9
18
64
78
48
52
68
24
22
24
22
78
52
64
68
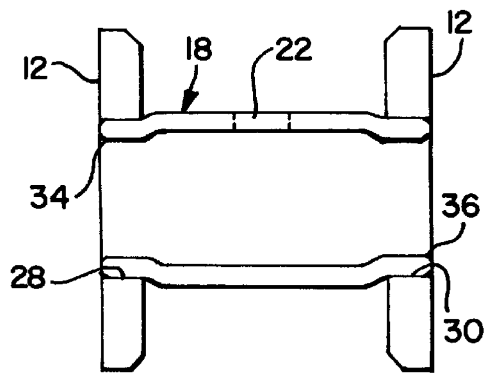
FIG.11
12
18
22
12
34
36
28
30

TAPERED BUSHING FOR A ROLLER CHAIN

BACKGROUND OF THE INVENTION

The present invention provides a bushing for a chain. More specifically, a roller-chain bushing has a relief zone provided in proximity to each of its edges, which relief zones are in areas to be compressed or compacted at press fitting of the bushing into an aperture of a bushing-link-plate along the pitch-line of the chain. The bushing-edge relief zone allows movement of bushing material to permit greater continuity and a consequent increase of the contact area between the link pin and the bushing, especially at initial contact between these two elements.

Roller chain assemblies generally utilize bushing-links and pin links with spaced apart apertures. A generally cylindrical bushing extends through a roller and between parallel bushing-links, which bushing is press fit into the juxtaposed apertures of the respective links. A pin extends through the bushing to secure the parallel link plates, roller and bushing to form a single link.

During assembly of the roller chain, the bushing is secured to the bushing link by press fitting it into the apertures of a bushing link. The as-formed bushings are generally a uniform cylinder, however, press fitting a bushing into the bushing-link holes or apertures deforms the cylinder ends. Bushing-end deformation results in deflection of the cylindrical shape, the inner diameter and the outer diameter of the bushing body, which resulted from the movement of material during press-fitting of the bushing ends. In an early effort to acconmmodate this material movement, material was removed from the bushing blank prior to roll-forming the bushing, which provided an opening or void in the bushing body to assimilate displaced material. This void may be considered as a degree of freedom for the central portion of the bushing. Thus, when the bushing cylinder ends are being deformed during the press fitting operation any movement of material along the bushing barrel-body would presumably be absorbed by the centrally positioned opening in the bushing body.

U.S. Pat. No. 2,424,087 to Focke et al. considered that smoother and denser surfaces of pitch holes in the side plates along with more tightly fit pins or bushings in those pitch holes provided greater fatigue resistance to the chain against failure by fracture of the side plates.

In another case, it had been indicated that press fitting the bushings into the holes induced residual compressive stress in the material surrounding the holes, which promoted increased fatigue resistance of the outer side plates. As a consequence, it was felt that the increased initial stress in the region of the bushing-receiving holes promoted increased fatigue resistance of the inner side plates. Further, U.S. Pat. No. 2,994,186 to Morrow asserted that utilizing a drift pin to cold work the region around the link plate holes both before and after heat treatment further increases the fatigue resistance of the link plates. The redrifting operation was used to produce improved fatigue resistance in the link plates and also to materially aid the extremely tight fits between the bushing and the link plate, which tight fits were considered to enhance the fatigue resistance of the link plates in the assembled chain.

Pressing a chain bushing into the pitch-holes of a bushing link compresses the bushing ends and alters the inner and outer diameter of the bushing. This alteration of the cylinder inner diameter is referred to in the industry as bushing collapse or barreling. As the chain operates, the pin bears, or should bear, against the inside wall of the bushing. As a result of the bushing collapse, the initial contact area between the pin and the bushing inner wall is limited to approximately point contact at the ends of the bushing where the inside diameter is at a minimum. The reduction of contact area between the pin and the bushing causes more rapid initial wear and elongation of the chain during operation.

Although the strength of the material surrounding the link hole may be enhanced by the mechanical working from the localized deformation experienced at press fitting of the bushing, the deformation of the bushing at its ends does not enhance the wear properties nor the fatigue properties of the chain. Rather, as noted above, the initial contact between the pin and the bushing is limited to a very small contact area within the bushing-link hole from the compression and deformation of the bushing at press fitting of the bushing and link. In one case, large deformation of the bushing-end deformation at press fitting into the bushing link has been avoided by rolling the edges of the unformed bushing blank to provide a tapered, or reduced, cross-sectional region at the bushing ends. The reduced cross-section avoids large compressive loads and bushing deformation during mating of the bushing and bushing link.

Changing the total circumference of the ends of the bushings manufactured from strip material requires an added and expensive operation, that is a separate strip rolling operation. The present invention eliminates the separate strip rolling operation by tapering the bushing blank only at its contact area with the pin along the pitch-line of the chain, which greatly reduces the amount of cold working required to achieve the needed taper. The taper may be provided by various methods, such as roll-forming the taper during blanking of the preform into the bushing or by coining, for example. Other exemplary cold working techniques include swaging, stamping or forging.

SUMMARY OF THE INVENTION

The present invention provides a roller-chain bushing having a stress-relief opening centrally located along the seam of a rolled or roll-formed bushing. A tapered or relief segment at the bushing ends permits compressive fitting of the bushing ends into a link-plate hole minimizing deformation of the bushing end. Particularly, the bushing inner circumference is locally deformed or worked, such as by coining, at a specific location prior to forming the bushing. The unformed bushing blank is deformed, tapered or worked in a region where the formed bushing will provide the worked region at the bushing ends diametrically opposite the seam. Locating the tapered region in this position avoids, reduces or compensates for barreling of the bushing body at mating of the bushing with the roller link-plate. Placing the tapered region along the chain pitch line at the point of stress concentration during assembly of the chain reduces the initial wear of the pin and the bushing from initial chain loading.

BRIEF DESCRIPTION OF THE DRAWING

In the figures of the drawing, like reference numerals identify like components, and in the drawing:

FIG. 6 is a plan view of an unformed blank with the deformed or tapered region noted thereon;

FIG. 7 is an end-view of the unformed blank of FIG. 6;

FIG. 8 is an enlarged view of the noted end of the blank in FIG. 7;

FIG. 9 illustrates a pair of formed bushings in phantom outline with the cold-worked regions noted in solid line;

FIG. 10 is a chain segment with the formed bushings oriented along the pitch line and press-fit into bushing links to provide greater contact area between the bushing inner surface and the link-pin; and, FIG. 11 is a longitudinal cross-section of a bushing mated into bushing links.

DETAILED DESCRIPTION OF THE PREFERRED EMBODIMENT

Figure 2:
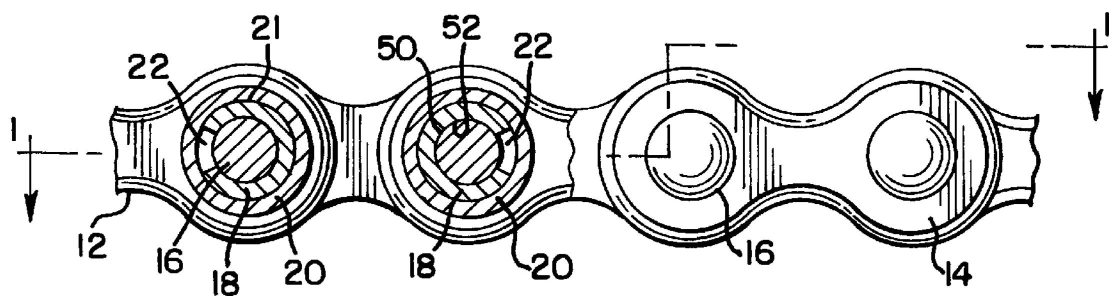
FIG. 2 shows an elevational view of a segment of the chain in FIG. 1 with a link end noted in cross-section.
Figure 1:
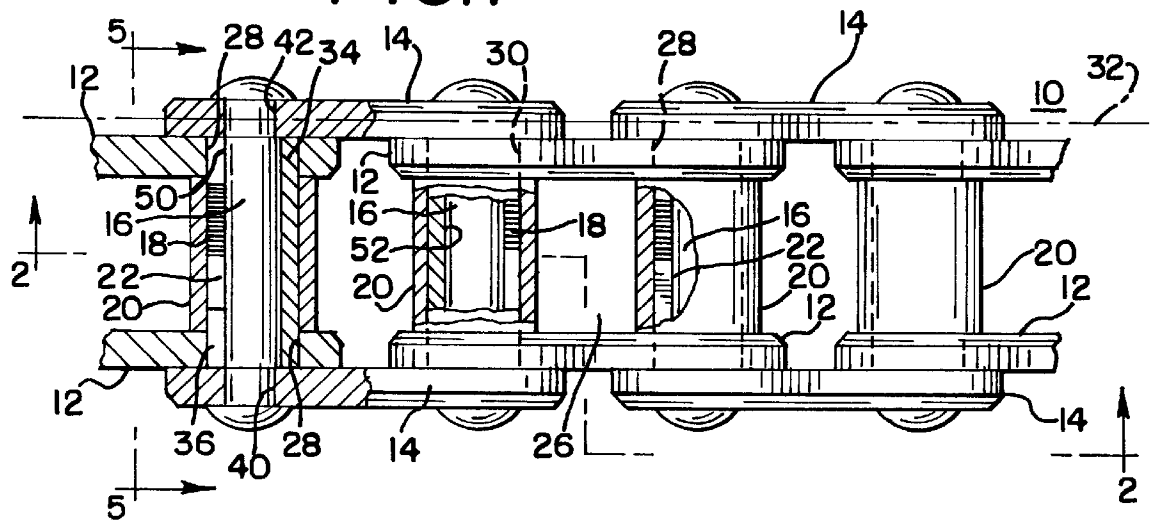
FIG. 1 illustrates a plan view of an exemplary roller chain section with a cross-sectional portion of the chain links.

In FIGS. 1 and 2, a segment or section of roller chain 10 is noted in plan and elevational views, respectively, with partial cross-sectional views of pin and link portions. More specifically, roller chain 10 has alternately arranged bushing links and pin links along each side of chain 10, which has bushing link-plate 12, pin link-plate 14, pins 16, bushings 18 and rollers 20. Bushing 18 includes stress-relief opening 22 along bushing seam 24, which opening 22 is noted as a diamond outline in FIGS. 4 and 5. The connected links in FIG. 1 provide gaps 26 for receipt of sprocket teeth (not shown).

Each bushing or roller link has a pair of bushing or roller link-plates 12, which are parallel and laterally spaced along the length of chain 10. Each link-plate 12 has first pitch-hole or aperture 28 and second pitch-hole or aperture 30 spaced along pitch-line 32 of chain 10, as noted in FIG. 1. Bushings 18 extend between parallel bushing link-plates 12 at each set of apertures 28 and 30, which bushings 18 are tightly received in apertures 28 and 30 at first bushing end 34 and second bushing end 36. Rollers 20 are positioned on outer surface 21 of each bushing 18, which rollers 20 bear upon the teeth of a sprocket associated with chain 10.

Pin links have a pair of parallel pin-link plates 14 with first port 40 and second port 42 along pitch line 32. Rivets or pins 16 extend between first ports 40 and through bushings 18 at each aligned set of apertures 28, 30 and ports 40, 42, respectively.

Each bushing 18 suffers a measure of deformation along both the length of its body as well as it its ends 34 and 36 when it is tightly fit or press fit into a bushing-link aperture 28 and 30, as noted in FIGS. 10 and 11. The specific deformation, or amount of deformation, of bushing 18 may vary with the placement of seam 24 and stress-relief opening 22. However with this deformed configuration, it can be appreciated that positioning of cylindrical link pin 16 through bushing 18 will result in contact between pin 16 and bushing 18 primarily at the mated and constricted position of bushing 18 in bushing-link apertures 28 and 30. This contact area between pin 16 and bushing 18 can be considered as aligned along pitch line 32 since assembly of chain 10 provides stress-relief openings 22 of each bushing link in a facing position along line 32.

Roller-link chains 10 are generally constructed in the above-noted manner, as known in the art. It is also known that tightly fit bushing ends 34 and 36 deform at mating with bushing apertures 28 and 30, as shown in the exemplary illustration of FIG. 11. The deformation of bushing ends 34, 36 reduces the internal reference or as-formed diameter 48 of as-formed bushing 18 at bushing ends 34, 36, which diameter 48 is noted in FIGS. 9, 10 and 11. The consequent barreling effect on bushing 18 from the noted deformation is shown in FIG. 10 on one side of bushing 18. This internal deformation reduces the contact area between outer surface 50 of pin 16, which is shown in FIG. 1, and internal surface 52 of bushing 18 from the overall length of bushing inner surface 52 to the proximate bushing surface at apertures 28 and 30.

Figure 3:
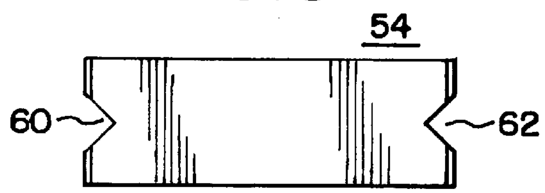
FIG. 3 is a plan view of a prior art unformed bushing blank with a stress-relief segment provided at opposing edges.
Figure 4:
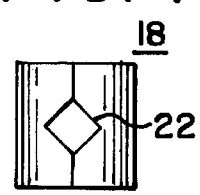
FIG. 4 is a formed bushing of the blank in FIG. 3 with the stress-relief segments in facing alignment and centrally located along the seam of the formed bushing.
Figure 5:
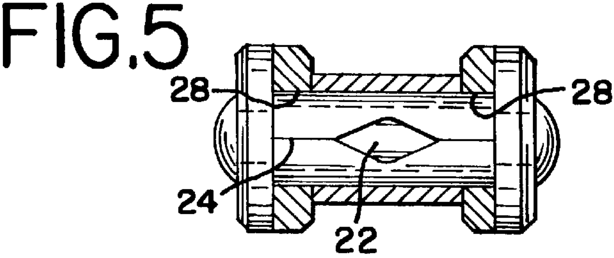
FIG. 5 is a partial cross-sectional view of a chain link along the line 5—5 in FIG. 1.

Earlier efforts at overcoming the barreling effect on bushings 18 provided a generally centrally located opening 22 along formed bushing seam 24, as shown in FIGS. 4 and 5. The illustrated shape of opening 22 is exemplary and not a limitation, which shape may vary and it may be formed by various methods. However, bushings 18 are commonly formed by rolling a strip 54 of flat stock, which is exemplified in FIG. 3, around a cylindrical mandrel, as known in the art. Strip 54 has clipped triangular areas 60 and 62 at each end of the preformed bushing blank, which areas 60 and 62 are abutted at formation of bushing 18 to form illustrated opening 22 in FIG. 9.

Strip 54 in FIGS. 3 and 6 is indicative of a shape for a preformed blank for the formation of bushing 18. Strip 54 has first edge 56 and second edge 58, which edges cooperate at formation around the noted mandrel to define bushing seam 24. Scalloped or clipped portions 60 and 62 generally centrally located along first edge 56 and second edge 58, respectively, are juxtaposed at formation of bushing 18 to form opening 22. Strip 54 includes outlined depression 64 along upper side edge 66 and similar outlined depression 68 along lower side edge 70, which depressions 64 and 68 are about diametrically opposite bushing seam 24 after formation of bushing 18. In FIG. 6, the outlined depressions 64 and 68 are shown as rectangular shapes on preform 54. It is clear that these rectangular shapes are generally centered between first and second edges 56 and 58. However, the length of each depression 64 and 68 is less than one-half the length of respective top and bottom edges 66 and 70 between first and second ends 56 and 58. Thus, when preform 54 is formed into bushing 18 depressions 64 and 68 are positioned diametrically opposite seam 24 and they are less than one-half the inner circumference of bushing 18 at an as-formed bushing reference position.

In FIG. 7, strip 54 is noted in a side view. An enlarged view of an encircled region of FIG. 7 along upper side edge 66 is shown in FIG. 8. Gap 74 in FIG. 8 shows the relative slope or depression of taper 64 and 68 from edge 66, or 70, where the taper is about three-thousandths inch from the reference surface 72, which becomes bushing internal surface 52, to upper side edge 66 of strip 54. In the illustration, only a taper of depression 64 is shown but taper 68 is similarly formed.

The as-formed bushing 18 and, the relationship between seam 24 and tapers 64 and 68 are noted in FIG. 9, which relationship is also shown in the structures of FIGS. 1 and 5. More specifically in FIGS. 1, 2, 9 and 10, opening 22 is noted along seam 24. In FIG. 9, tapers 64 and 68 are diametrically opposite seam 24 with tapers 64 and 68 upwardly and outwardly sloping from reference surface and internal wall 52 of bushing 18 to bushing ends 34 and 36. At assembly or press fitting of bushing 18 in FIGS. 10 and 11, particularly with bushing end 34 or 36 pressed into bushing aperture 28 or 30, the bushing deformation or barreling is noted with one bushing sidewall appearing to bulge outward from the reference position of surface 52. However, tapers 64 and 68 deflect to deform the bushing region in proximity to bushing ends 34 and 36 to provide tapers 64 and 68 in substantial alignment with inner surface 52 to thus provide a substantially uniform surface to contact pin 16. In this context, pin 16 bears against continuous surface 52, as well as reformed tapers 64 and 68, in bushing passage 78. The portion of surface 52 in bushing passage 78, which is diametrically opposed to tapers 64 and 68, experiences the deformation at assembly previously known and described above. This prior deformation was, at least partially, to be accommodated by opening 22.

Earlier efforts and methods of accommodating the excess deformation of surface 52 in passage 78 required a separate rolling operation to taper or form edges 66 and 70 of blank 54. Slight deformation, as shown with deformed regions 64 and 68, of edges 66 and 70, at the required location, may be provided by various manufacturing techniques such as coining or stamping. This slight deformation provides the requisite deformation at noted edges 66 and 70 for deformation into a nominally reformed or reconfigured internal surface 52, that is generally aligned along the load-bearing bushing area of pitch line 32. Deformed regions 64 and 68 can be formed during bushing manufacture by a simple operation, such as coining, stamping, swaging or roll-forming on a mandrel with a detent, which operation can be accommodated without extensive equipment or with a minimal secondary operation. More particularly, deformation of regions 64 and 68 may be integrated into a stamping operation for the forming of bushing blank or preform 54 with little or no added capital and operational expense. Thus, greater initial surface contact is provided between pin 16 and bushing 18 beyond the bushing initial-contact area within bushing-link apertures 28 and 30. The increase in contact area spreads the initial contact load of the chain across a greater pin area to avoid or reduce chain elongation and to enhance chain longevity. It is also considered that the geometry of deformed regions 64 and 68, along with the extant bushing structure and the orientation of regions 64 and 68 along chain pitch-line 32 provides added strength to the formed and assembled links and chain.

While only specific embodiments of the invention have been described and shown, it is apparent that various alterations and modifications can be made therein. It is, therefore, the intention in the appended claims to cover all such modifications and alterations as may fall within the scope and spirit of the invention.

I claim:

1. In a roller chain having a series of alternately arranged pin-links and roller-links, each said link having a pair of generally parallel link plates, each said plate having a first aperture and a second aperture, a plurality of pins, a pitch line longitudinally extending along said chain and said plates between said apertures, each said pair of parallel link plates having their respective first and second apertures approximately aligned, a plurality of bushings, each of said bushings extending between one set of the aligned apertures of one pair of parallel roller link plates and each of said pins extending through one bushing and between one set of the aligned apertures of one pair of parallel pin link plates, wherein each of said bushings has an as-manufactured reference state and a second state, each of said bushings at said as-manufactured reference state being generally cylindrical and having a longitudinal axis, a first end, a second end, a first inner cross-sectional diameter, a first outer cross-sectional diameter, a circumference at said first and second ends, and a first wall thickness, each of said bushings at said as-manufactured reference state having a first depression at one of said first and second ends, and a second depression at the other of said first and second ends, said first and second depressions being tapered from said first and second outer ends inward to said first inner diameter and being less than one-half said circumference at said first and second ends, said first and second depressions at said first and second ends of each said bushing aligned along said bushing longitudinal axis, wherein at said second state each of said bushings rigidly fits into each said respective aperture of said respective pair of parallel roller-link plates at said first bushing end and second bushing end, said rigidly fit first bushing end and second bushing end formed to mate with the respective aperture of said parallel roller-link plates and having said first and second depressions aligned with said chain pitch line, said first and second bushing ends deformed at said mating with said aperture and said depressions at said first and second ends deformed to provide a generally continuous inner surface of said bushing in said respective link-plate apertures and said bushing central passage to provide a generally continuous contact area for said pin along said inner surface at said pitch line.

2. In a roller chain having a plurality of bushings, pins, rollers and a series of alternately arranged pin-links and roller-links formed as pairs of spaced link-plates with spaced apertures, said bushings fitted between said roller-link plate apertures, said pins transversely extending through the bushings of adjacent roller-links, and said rollers having said bushings extending therethrough, said chain having a pitch line along said apertures in each said link-plate, each of said bushings being generally cylindrical with a first end, a second end, a longitudinal axis, a wall, an inner wall surface and an outer wall surface, each of said bushings having a seam extending between said first end and said second end, said seam generally parallel to said bushing longitudinal axis, each of said bushings having a strain-relieving opening in said bushing wall along said seam, wherein each of said bushings includes:

at least one tapered area on a portion of said bushing inner wall at each said bushing first end and said second end, said tapered areas aligned along said bushing longitudinal axis, at least one non-tapered area on a portion of said bushing inner wall at each said bushing first end and bushing second end, said bushing first and second ends inserted in said roller-link plate aperture with said seam aligned along said pitch line and deformed within said roller-link plate apertures at said bushing first and second ends, each said bushing in said chain having a contact area with a mating roller-link plate along said pitch line, said taper in said bushing arranged along said pitch line to provide said contact area at said tapered areas within said roller-link plate aperture to increase the contact area between the pin and bushing inner wall within the roller-link plate apertures for distribution of a contact load between said bushing and said roller-link plate at an initial use of said chain.

3. A method for producing a bushing for a roller chain, which bushing has bushing ends and provides a compensating zone for deformation of said ends to provide a larger initial contact area between a mated pin and said bushing to promote longer wear of said chain, said chain having a plurality of bushings, pins, rollers and a series of alternately arranged pin-links and roller-links formed as pairs of spaced link-plates with spaced apertures, said bushings fitted between said roller-link plate apertures of said pairs of roller-link plates, said pins transversely extending through the bushings of adjacent roller-links, and said rollers having said bushings extending therethrough, said chain having a pitch line along said apertures in each said link-plate, each of said bushings being formed by the method comprising:

a. providing a preformed and generally rectangular blank with a first edge, a second edge, a top end and a bottom end, said first and second edges generally parallel to each other, and said top and bottom ends generally parallel to each other;

b. cropping a strain-relieving portion from said blank along each said first and second edge, said strain-relieving portions generally aligned with each other;

c. forming at least one tapered area at a portion of an inner wall of each of said top end and bottom end, which tapered areas are generally aligned with each other and spaced from said first edge and second edge such that the tapered area is less than one half a width of said top and bottom end; and d. forming said preformed blank into a cylinder with a through-passage to generally align said first edge and said second edge to form a seam in said cylinder and bushing.

4. In a roller chain having a series of alternately arranged pin-links and roller-links, each said pin-link having a pair of generally parallel pin-link plates, each said roller-link having a pair of generally parallel roller-link plates, each said pin-link plate having a first aperture and a second aperture, each said roller-link plate having a first aperture and a second aperture, a plurality of pins, a pitch line longitudinally extending along said plates between said apertures, each of said pair of parallel pin-link plates having their respective first and second apertures approximately aligned, each said pair of parallel roller-link plates having their respective first and second apertures approximately aligned, one of said pins extending between each pair of aligned first and second apertures of each pair of parallel pin-link plates, a plurality of bushings, each of said bushings having an as-manufactured reference state and an as-assembled reference state, each of said bushings at said as-manufactured reference state having a general cylindrical shape, a longitudinal axis, a first end, a second end, a circumference at said first and second ends, an inner and outer surface at said first and second ends and a first wall thickness, each of said bushings at said as-manufactured reference state having a first depression at a portion of the inner surface of one of said first and second ends, and a second depression at a portion of the inner surface of the other of said first and second ends, said first and second depressions being less than the full circumference of said bushing at said first and second ends, wherein at said as-assembled reference state each of said bushings extends between and rigidly fits into one pair of aligned apertures of one pair of parallel roller-link plates and each pin extends through one of said bushings, wherein at said as-assembled reference state the first end and second end of that bushing are deformed.

5. The roller chain of claim 4 wherein said first and second depressions are in the inner surfaces of the ends of each bushing.

6. The roller chain of claim 4 wherein said first and second depressions are less than one-half the circumference at said first and second ends.

* * * * *